Patented Sept. 25, 1934

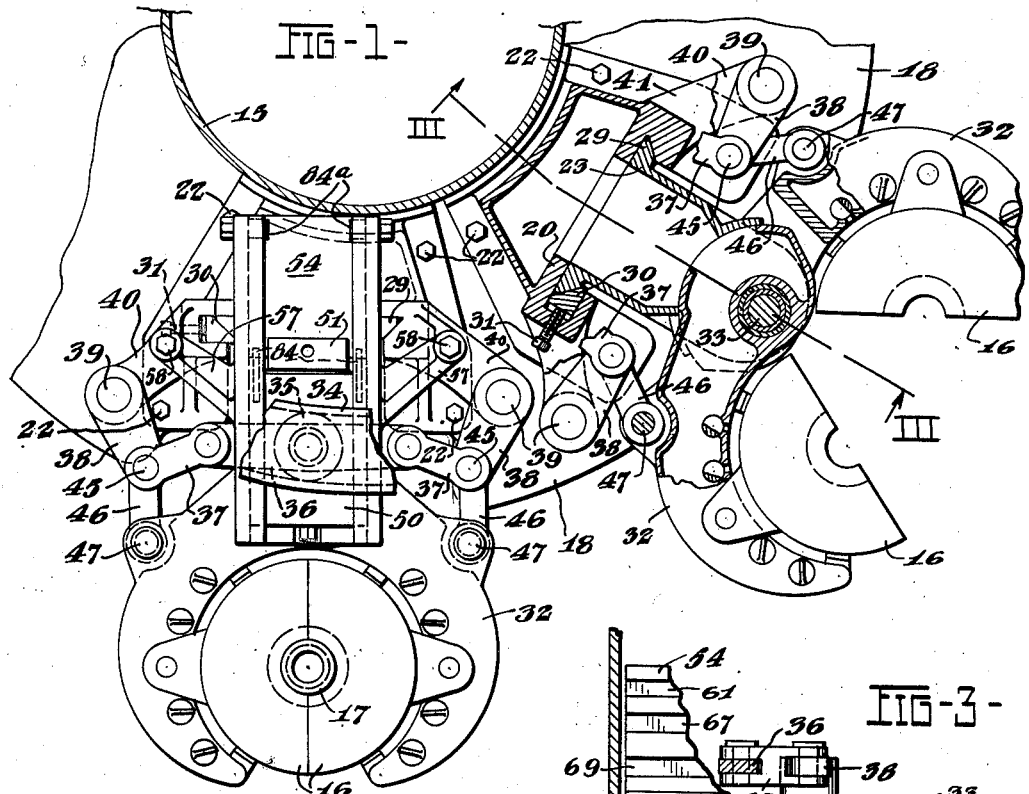

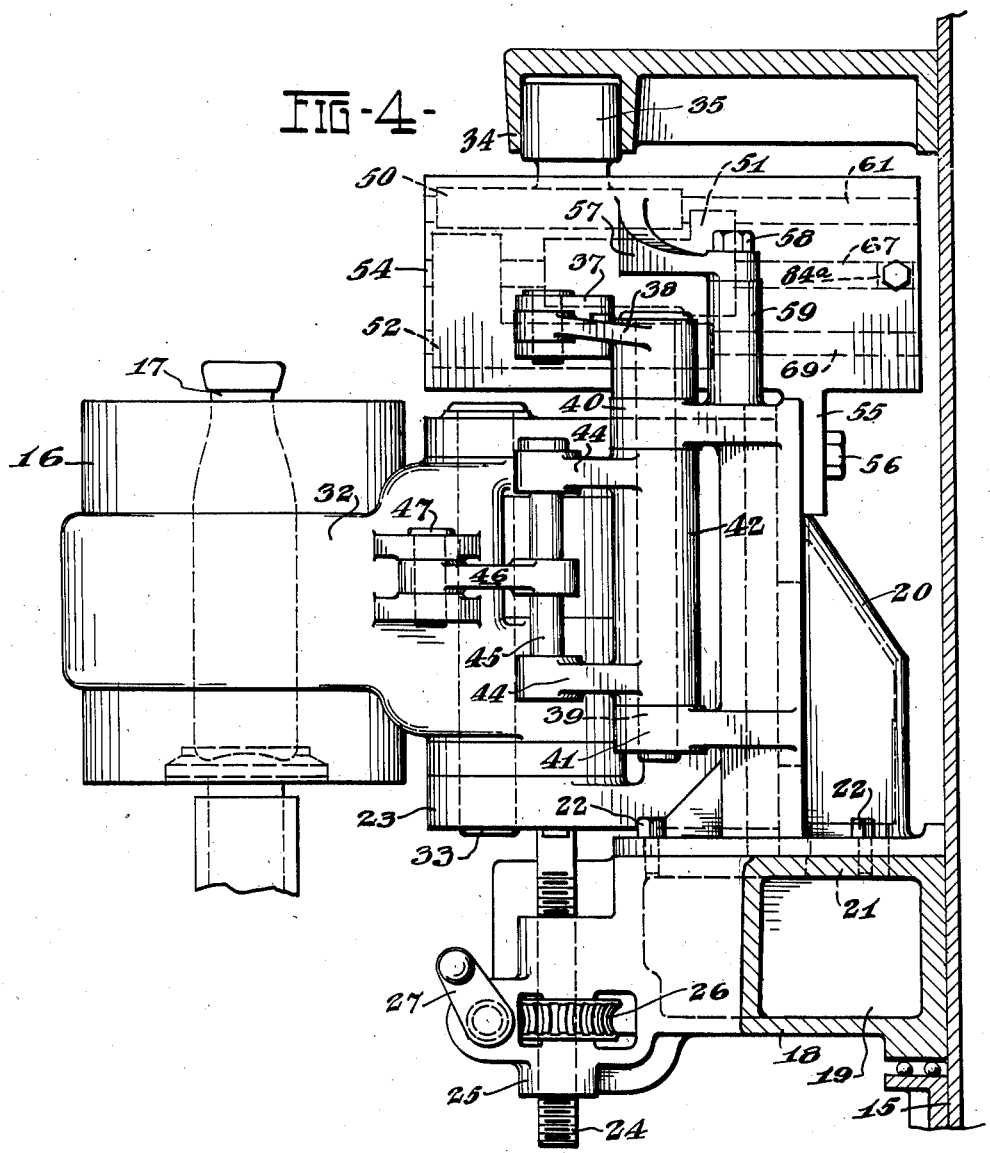

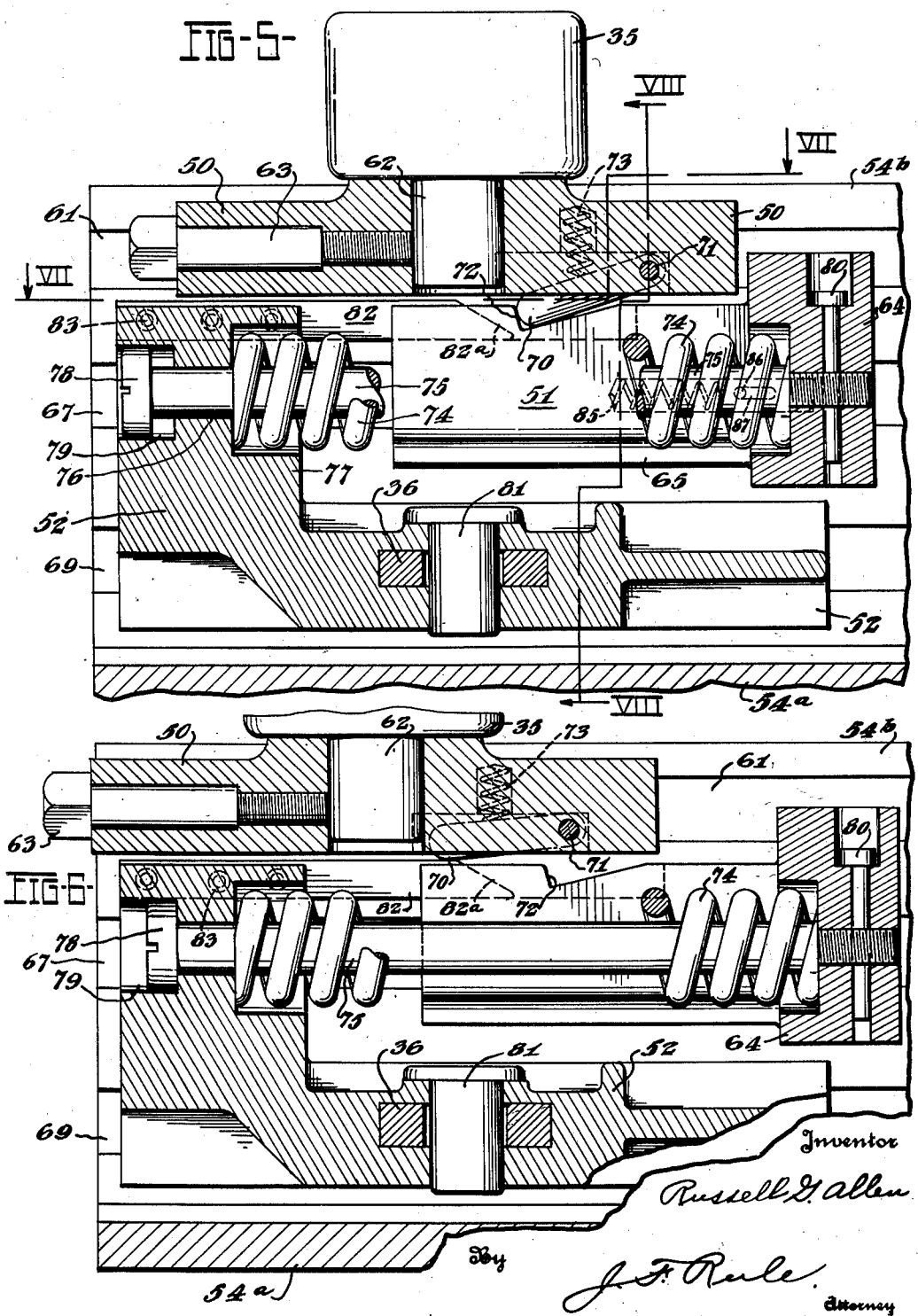

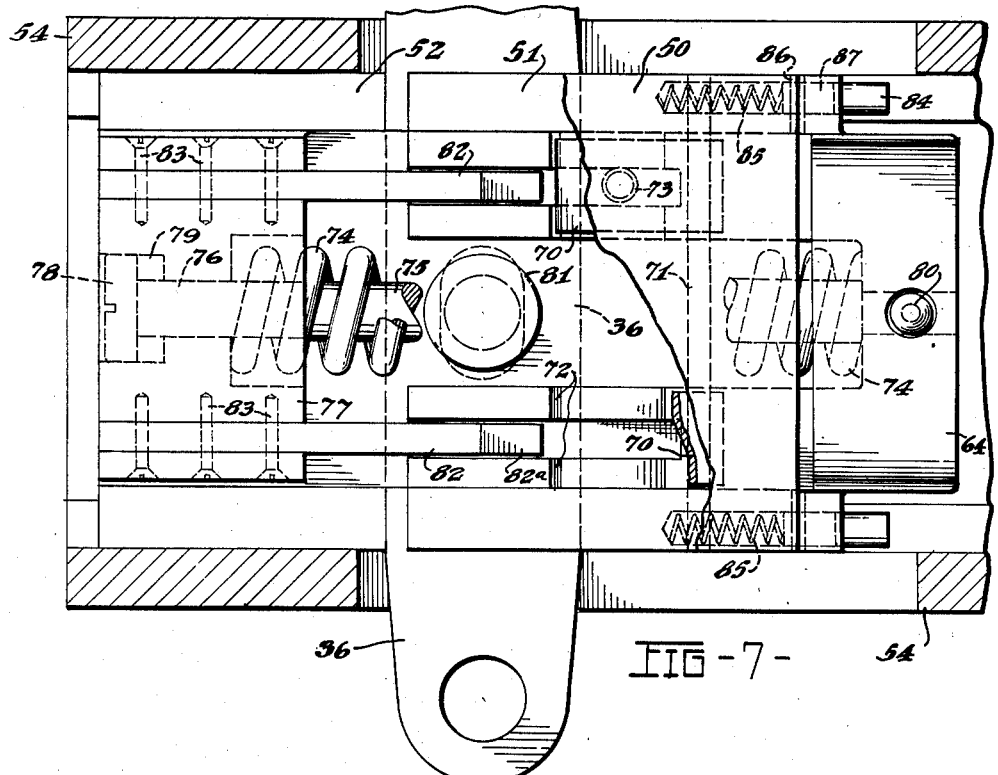
FIG-7-
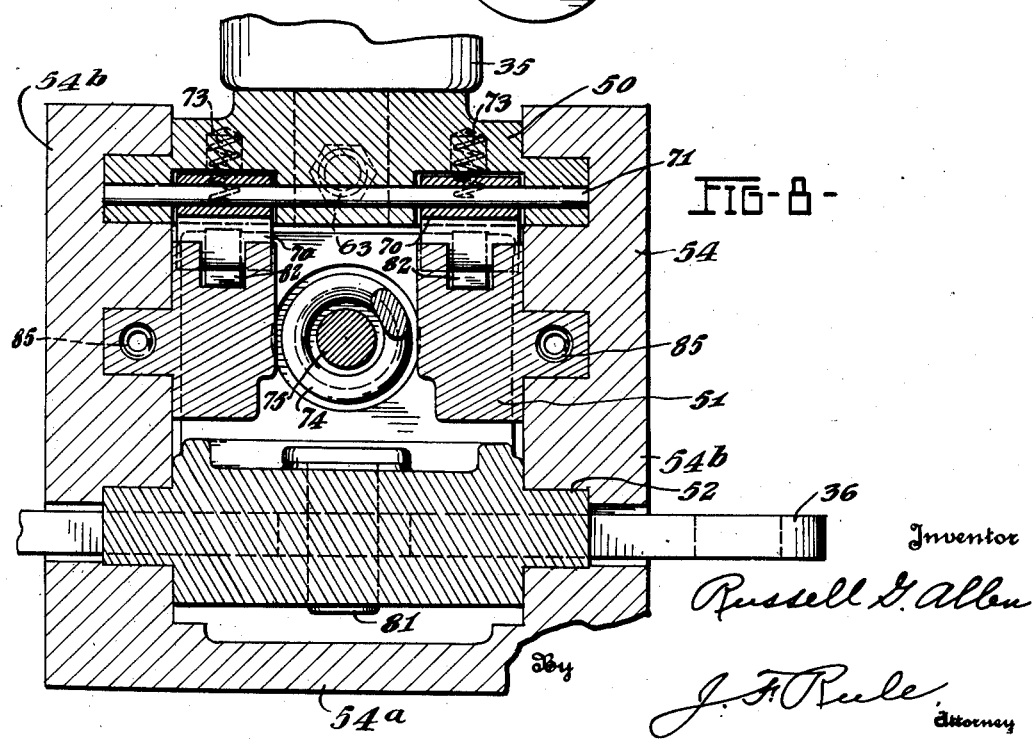
FIG-8-
Inventor
Russell G. Allen
By J. F. Rule,
Attorney

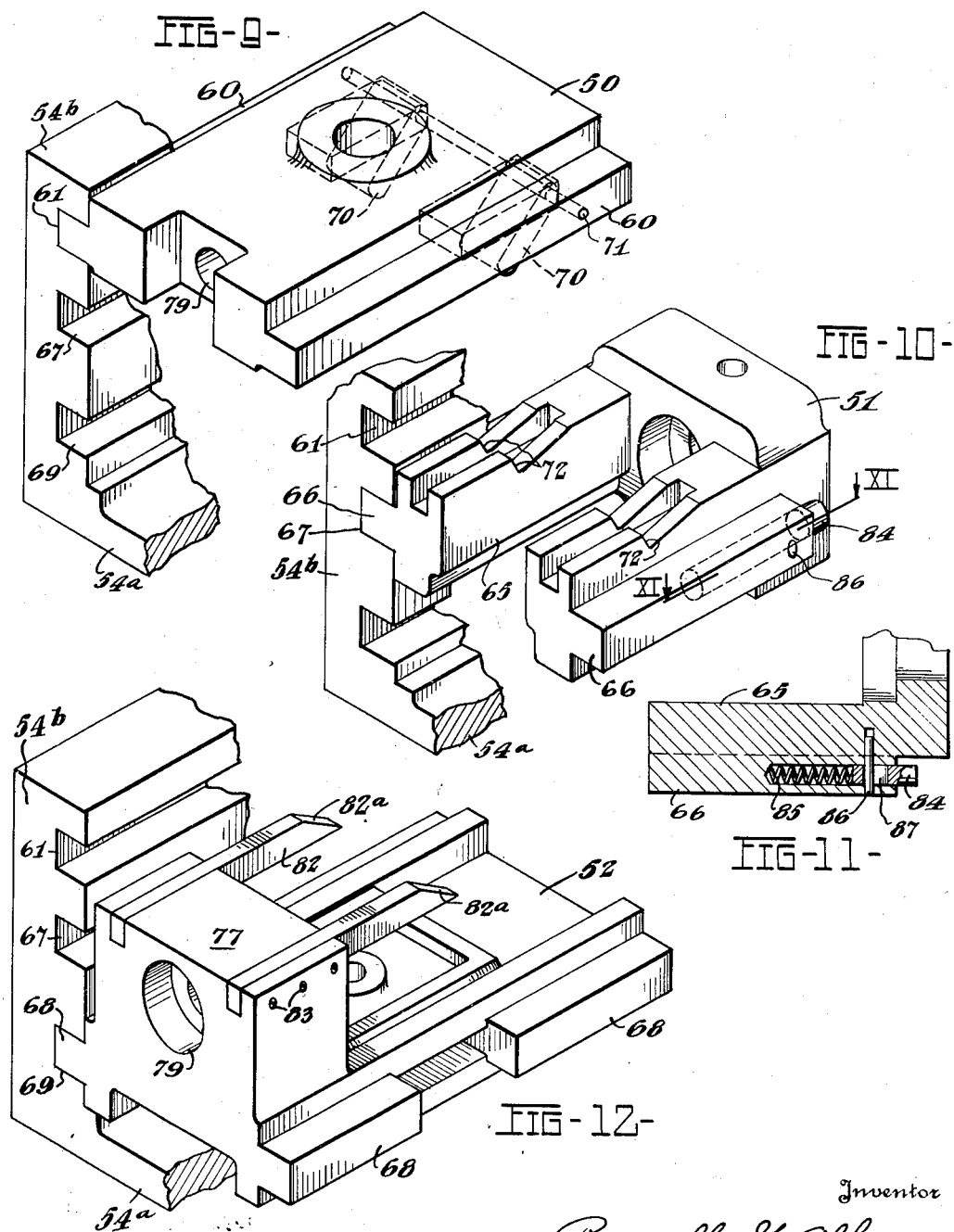

1,974,841

UNITED STATES PATENT OFFICE 1,974,841

GLASS MOLDING MACHINE

Russell G. Allen, Alton, Ill., assignor to Owens-Illinois Glass Company, a corporation of Ohio Application March 27, 1933, Serial No. 662,920

7 Claims. (Cl. 49—42)

My invention relates to machines for blowing hollow glass articles in molds and more particularly to the molds and their operating mechanisms.

An object of the invention is to provide improved mechanism for opening and closing partible molds, which is reliable in construction and operation and adapted for heavy service with comparatively large molds.

A further object of the invention is to provide a novel, efficient and practical form of safety mechanism by which injury to the molds and their operating mechanism is prevented in the event of any obstruction interfering with the mold closing movements.

A further feature of the invention relates to improved means for adjusting the molds bodily up and down.

Other objects of the invention will appear hereinafter.

In the accompanying drawings:

Figure 1 is a part sectional plan view showing two mold units, each comprising a finishing mold and its operating mechanism, forming part of a machine constructed in accordance with the present invention.

Fig. 2 is a front elevation view of a mold unit shown in Fig. 1.

Fig. 3 is a fragmentary sectional elevation, the section being taken at the line III—III on Fig. 1.

Fig. 4 is a side elevation on a larger scale, of a mold unit.

Fig. 5 is a sectional elevation showing the slide blocks forming part of the mold opening and closing mechanism and including the safety mechanism.

Fig. 6 is a similar view, but with the parts in a different relative position assumed when the safety device has been brought into operation.

Fig. 7 is a part sectional plan view showing the slide blocks, the section being taken at the line VII—VII on Fig. 5.

Fig. 8 is a sectional elevation at the line VIII—VIII on Fig. 5.

Fig. 9 is a perspective view of the upper slide block and its guide.

Fig. 10 is a perspective view showing the intermediate slide block.

Fig. 11 is a detail section at the line XI—XI on Fig. 10.

Fig. 12 is a perspective view showing the lower slide block.

Referring to the drawings, the invention is herein illustrated as adapted to and forming part of a glass blowing machine of the type in which an annular series of molds and their operating mechanisms are mounted on a carriage which is rotated horizontally. The mold carriage rotates about the vertical axis of the stationary column 15. Mounted on the mold carriage are molds 16 and their operating mechanisms. Each mold and its operating mechanism comprises a unit, said units being arranged in an annular series about the center column. The mold 16 as herein shown is a finishing mold in which parisons 17 transferred thereto from a preliminary mold, are blown to their finished form.

The mold operating mechanism is supported on an annular frame 18 consisting of a casting made hollow to provide an air chamber 19. Above the frame 18 is a vertically disposed frame piece 20 also of hollow construction to provide an air passage opening into the chamber 19 through a port 21 in the upper wall of said chamber. Bolts 22 secure the frame 20 in position on the frame 18.

The frame 20 supports a mold carrying head or frame 23 slidably mounted therein for vertical adjustment of the mold, thereby adapting it to neck molds of different lengths. Means for effecting such adjustment comprises a vertical shaft 24 which bears against the lower surface of the frame 23 and supports the weight of said frame and parts carried thereby. The shaft 24 extends downward through an opening provided in a bracket 25 formed on the frame 18 and is screw threaded to receive a worm wheel 26 journaled in the bracket 25 and threaded on said shaft. A hand crank 27 is secured to a worm 28 which is journaled in the bracket 25 and runs in mesh with the worm wheel 26. By rotating the hand crank, the frame 23 and mold carried thereby can be adjusted up or down as may be required, for example, to accurately adjust the mold to a cooperating neck mold (not shown) by which the parison 17 is suspended while being enclosed within the finishing mold. The adjustable frame 23 is formed with ribs 29 (Fig. 1) which are slidable vertically in corresponding guideways formed in the frame 20, whereby the frame 23 is supported and guided in its vertical movements. A guide strip 30 (Fig. 1) is supported in the frame 20 and provides a bearing for one of the ribs 29. Said guide strip is adjustable as by means of adjusting screws 31 to take up wear or lost motion between the frames. The screws 31 may also serve to clamp the parts in adjusted position.

The mold 16 is made as usual in two partible sections having their meeting faces in a vertical plane, said sections being carried by mold arms 32 mounted to swing about a vertical hinge pin 33 in the frame 23.

The opening and closing movements of the mold are under the control of a stationary cam 34 on which runs a cam roll 35. Said roll has operating connections through a series of slide blocks, as hereinafter described, with an equalizing cross bar or yoke 36 through which movement is transmitted to the mold arms. Links 37 connect the ends of said cross bar to rock arms 38 attached to the upper ends of pivot pins 39, each journaled in upper and lower arms 40 and 41, respectively, formed on the frame 20. Mounted on each pivot pin 39 between the arms 40 and 41 is a sleeve 42 keyed to said pin, said sleeve having formed integral therewith laterally extending arms 44 in which is mounted a vertical hinge pin 45. Each pin 45 has an operating connection with the corresponding mold arm 32 through a link 46 connected at one end to the pin 45 and at its opposite end connected by a pivot pin 47 to the mold arm. The links 46 are slidable vertically on the pins 45 to permit vertical adjustment of the mold carrying frame 23 as heretofore described. It will be seen that movement of the cross bar 36 toward and from the center of the machine in the manner hereinafter described, will operate through the links 37 and rock arms 38 to rock the shafts 39, and that this movement of the rock shafts 39 will be transmitted through the rock arms 44 and links 46 to the mold carrying arms 32 for opening and closing the molds.

The mechanism interposed between the cross bar 36 and the cam roll 35 will now be described. Such mechanism includes an upper slide block 50, an intermediate slide block 51, and a lower slide block 52, said slide blocks being mounted one above another in a slide supporting frame 54. The frame 54 is positioned above and supported on the frame 20. A lug 55 (Figs. 3 and 4) extends downward from the frame 54 and is secured to the frame 20 by a bolt 56, thus rigidly securing the frame 54 to the frame 20. The frame 54 is additionally supported by means of integral arms 57 extending laterally and rearwardly therefrom and connected by bolts 58 to standards 59 rising from the frame 20. The guide frame 54, as shown in Figs. 8 to 12, is substantially U-shaped and comprises a horizontal base 54$^a$ and vertical walls 54$^b$. The upper slide block 50 (Figs. 9) is formed with ribs 60 which slide in guideways 61 formed in the walls 54$^b$. The cam roll 35 is rotatively mounted on a pin 62 which extends downward in a vertical opening in the block 50. A locking pin 63 extending horizontally through an opening in said block and screw threaded therein, engages the pin 62 and locks it in position.

The intermediate slide block 51 is in the form of a yoke comprising a cross piece or head 64 and horizontal arms 65, the latter formed with ribs 66 slidable in guideways 67 formed in the walls 54$^b$. The lower slide block 52 (Fig. 12) is formed with ribs 68 which are slidably mounted in guideways 69 in the walls 54$^b$.

Each of the slide blocks 50, 51 and 52 is capable of a limited horizontal sliding movement in the frame 54 relative to the other slide blocks. An operating connection between the upper slide block 50 and the intermediate slide block 51 is effected by means of a pair of latches 70 pivotally mounted in the block 50 by means of a hinge pin 71. The latches 70 are normally in the position shown in Fig. 5, in which they are inclined downwardly and engage shoulders 72 formed by cutting recesses in the upper faces of the arms 66 of the intermediate slide block. Coil springs 73 bear down on the latches and supplement the action of gravity in lowering the latches and holding them in their lowered position.

An operating connection between the intermediate slide block 51 and the lower slide block 52 is provided through a heavy coil spring 74 mounted on a connecting bolt 75. Said bolt extends through a close fitting opening 76 in the head 77 of the lower slide block. The bolt 75 is formed with a head 78 which enters a close fitting recess or enlargement 79 of the opening 76 which acts as a dash pot to cushion the action between the head 78 and the slide 52 due to the high pressure built up on the spring 74 when the latches 70 are disengaged in the manner hereinafter set forth. The opposite end of the bolt is of reduced diameter and screw threaded into a correspondingly threaded opening in the head 64 of the intermediate slide block. A locking pin 80 extends downward through openings in the head 64 and bolt 75 for locking the latter in position. The coil spring 74 bears at its left hand end (Fig. 5) against the head 77 of the lower slide block and at its right hand end against the head 64 of the intermediate slide block.

The cross bar 36 is mounted in the lower slide block 52, extending transversely through said block and secured therein by a pin 81. The cross bar is free to slide lengthwise a limited amount for equalizing the closing movement of the mold halves about the bottom plate. The slide block 52 is provided with latch releasing bars 82 (Figs. 5 and 12) adapted to ride under the latches 70 and release them from the slide block 51 under abnormal conditions, as hereinafter set forth. The releasing bars 82 may be removably secured to the head 77 by means of screws 83. The slide block 51 (see Figs. 10 and 11) has mounted thereon buffer pins 84 held in their projected position by springs 85, said pins having a limited sliding movement determined by a locking pin 86 extending through a slot 87 in the pin 84. The purpose of the buffer pins 84 will appear hereinafter.

During the normal operation of the mold opening and closing mechanism, the slide blocks 50, 51 and 52 are held in the relative position shown in Fig. 5. The closing movement of the mold is effected by outward movement (from right to left, Fig. 5) of the cam roll. This movement is transmitted by the block 50 through the latches 70 to the intermediate block 51. The movement of the block 51 is transmitted through the coil spring 74 to the lower slide block 52 which carries the cross bar 36. This outward movement of the cross bar 36 operates through the connections heretofore described to close the mold. When the mold is closed the cam carries the slides 50 and 51 a slight distance further for overtravel which separates the head 78 of the bolt 75 from bottom of recess in the slide 52, thereby building up a spring pressure to hold the mold closed.

For opening the mold the cam roll 35 is moved to the right (Fig. 5), thereby causing the end of the upper slide block 50 to engage the head 64 of the intermediate block 51 and cause the latter to be carried to the right. The block 51 as it moves to the right carries with it the bolt 75 so that the head of the bolt engages the lower slide block 52 and carries it to the right, thereby operating to open the mold.

If, during the mold closing movement, any obstruction interferes with the complete closing of the mold, the safety mechanism will be brought into operation as follows: Assuming such obstruction prevents movement of the lower slide block 52, then the movement of the intermediate block 51 from right to left will compress the coil spring 74 while the lower block remains stationary. As the upper and intermediate slide blocks are thus moved to the left, the latches 70 engage the inclined faces 82ᵃ of the latch releasing bars 82, thereby lifting the latches from the shoulders 72 and disconnecting the upper slide block 50 from the intermediate block 51. The spring 74 forces the slide 51 back into position away from the releasing bars 82 so that the links 70 will be free to drop into their working positions when the slide 50 returns. The dash pot action of the bolt head 78 working in the recess 79 absorbs the shock due to the high spring pressure forcing the slides apart. All strain on the mold closing mechanism is removed when the latches 70 are released, so that the cam roll can complete its mold closing movement without affecting the mold. When the cam roll is returned, the latches 70 will be brought again to the Fig. 5 position and reestablish an operating connection between the upper and intermediate slide blocks.

The buffers 84 may come into operation during the resetting movement of the parts after the safety device has operated. They are adapted to contact with the stop blocks 84ᵃ (Fig. 4) at the inner end of the frame 54. Their operation is as follows: When the safety latches 70 have been released during the mold closing movement of the cam roll the upper slide block 50 is carried forward relative to the block 51, as shown in Fig. 6. When the block 50 returns, it will strike the intermediate slide 51 and may bump the latter with sufficient force to move it inwardly (to the right, Fig. 6) before the latches 70 drop into position behind the shoulders 72, particularly if the latches are at all sluggish in action. This would cause the slide 51 to be moved to the right and strike the stop blocks 84ᵃ with more or less of a jolt, due to the inertia of the mold equipment. The buffers 84, however, prevent jarring of the parts in this manner. Of course, if the latches 70 drop into position immediately when they have passed the shoulders 72 during the inward movement of the cam roll, they will lock the slide 51 against being thrown suddenly to the right.

Modifications may be resorted to within the spirit and scope of my invention.

I claim:

1. In a machine for molding glass articles, the combination of a partible mold, a movable element, mechanism interposed between said element and the mold for opening and closing the mold, said mechanism comprising slide blocks, a latch providing a connection between said blocks whereby they normally move as a unit during the mold closing movement, and means separate from said blocks for automatically tripping the latch and breaking said connection between the blocks when the closing movement of the mold is obstructed.

2. In a machine for molding glass articles, the combination of a partible mold, a movable element, mechanism interposed between said element and the mold for opening and closing the mold, said mechanism comprising slide blocks, a power transmitting connection including a latch between said slide blocks and by which said blocks are caused to move as a unit during the normal opening and closing movements of the mold, a coil spring providing a power transmitting connection between one of said blocks and the mold and through which power is transmitted during the normal opening and closing movements of the mold, said spring permitting movement of the blocks relative to the mold under an abnormal resistance to the mold closing movement, and means operable by said relative movement of the blocks and mold to release said latch and thereby break the operating connection between the mold and said movable element.

3. In a machine for molding glass articles, the combination of a mold, a mold closing device, power transmitting mechanism interposed between said device and the mold, said mechanism including relatively movable elements, a latch connecting said elements and holding them against relative movement during the closing of the mold, said power transmitting mechanism including a spring placed under an increasing tension by the movement of the mold closing device when an abnormal resistance is offered to the closing movement of the mold and while said elements are held against relative movement, and means operable when the spring is placed under tension to release said latch.

4. The combination of a traveling mold carriage, a partible mold thereon, a stationary cam, a cam roll traveling with the mold carriage and running on said cam, power transmitting mechanism interposed between the cam roll and the mold for imparting opening and closing movements to the mold, said mechanism including slide blocks, means forming a driving connection between said slide blocks and holding them against relative movement during the closing of the mold, said mechanism including a spring placed under an increasing tension by the movement of the cam roll when an obstruction prevents the closing movement of the mold and while the slide blocks are held against relative movement, and automatic means operable when the spring is placed under said tension to break said connection between the slide blocks.

5. The combination of a traveling mold carriage, a partible mold thereon, a stationary cam, a cam roll traveling with the mold carriage and running on said cam, power transmitting mechanism interposed between the cam roll and the mold for imparting opening and closing movements to the mold, said power transmitting mechanism comprising slide blocks, a latch forming a driving connection between the first and second of said slide blocks, a spring forming a driving connection between the second and third of said slide blocks, and means operable by a relative movement of said second and third slide blocks to release said latch.

6. In a machine for molding glass articles, the combination of a partible mold, a mold operating element, mechanism interposed between said element and the mold for transmitting opening and closing movements from said element to the mold, said mechanism including upper, lower and intermediate slide blocks, a latch forming a driving connection between the upper and intermediate slide blocks, a coil spring forming a driving connection between the intermediate and lower slide blocks, and means operated by a relative sliding movement of the intermediate and lower slide blocks to release said latch.

7. In a machine for molding glass articles, the combination of a partible mold, a movable element, mechanism interposed between said element and the mold for opening and closing the mold, said mechanism comprising slide blocks, a latch providing a connection between said blocks and causing them to normally move as a unit during the mold closing movement, and a latch releasing device movable relatively to said blocks into position to trip the latch and break the connection between the blocks when the closing movement of the mold is obstructed.

RUSSELL G. ALLEN.